(12) United States Patent
Abe et al.

(10) Patent No.: US 9,788,678 B2
(45) Date of Patent: Oct. 17, 2017

(54) HEATING COOKER

(71) Applicant: Panasonic Corporation, Kadoma-shi, Osaka (JP)

(72) Inventors: Kuniaki Abe, Shiga (JP); Yuji Hayakawa, Shiga (JP); Masaki Shibuya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 304 days.

(21) Appl. No.: 14/386,252

(22) PCT Filed: Mar. 15, 2013

(86) PCT No.: PCT/JP2013/001789
§ 371 (c)(1),
(2) Date: Sep. 18, 2014

(87) PCT Pub. No.: WO2013/140773
PCT Pub. Date: Sep. 26, 2013

(65) Prior Publication Data
US 2015/0047514 A1 Feb. 19, 2015

(30) Foreign Application Priority Data
Mar. 19, 2012 (JP) .................. 2012-062494

(51) Int. Cl.
*A47J 27/04* (2006.01)
*F24C 15/32* (2006.01)
*H05B 6/64* (2006.01)

(52) U.S. Cl.
CPC ............. *A47J 27/04* (2013.01); *F24C 15/327* (2013.01); *A47J 2027/043* (2013.01); *H05B 6/6479* (2013.01)

(58) Field of Classification Search
CPC ... A47J 27/04; A47J 2027/043; H05B 6/6479; H05B 6/6458; F24C 15/327
(Continued)

(56) References Cited

U.S. PATENT DOCUMENTS 4,655,192 A * 4/1987 Jovanovic ................ A21B 3/04
126/20
6,133,558 A * 10/2000 Ueda ....................... H05B 6/645
219/682

(Continued)

FOREIGN PATENT DOCUMENTS

CN 1011122888 A 1/2008
FR 2958723 10/2011
(Continued)

OTHER PUBLICATIONS

International Preliminary Report on Patentability in corresponding International Application No. PCT/JP2013/001789, dated Sep. 25, 2014, 5 pages.

(Continued)

*Primary Examiner* — Reginald L Alexander
(74) *Attorney, Agent, or Firm* — Brinks Gilson & Lione (57) ABSTRACT

A heating cooker includes a housing having a heating chamber defined therein, cooking dish support sections respectively provided on mutually opposed inner wall surfaces of the heating chamber to support opposite ends of a cooking dish in one of a plurality of vertically spaced support positions, a steam generating unit, and a steam ejecting portion having a single discharge port formed in an inner wall surface of the heating chamber and a steam passageway provided to guide the steam to the discharge port. The steam ejecting portion ejects the steam into the heating chamber through the discharge port. The single discharge port is provided in the inner wall surface confronting a space between the cooking dish supported in an (Continued)

uppermost support position of the cooking dish support sections and a ceiling surface of the heating chamber.

2 Claims, 7 Drawing Sheets

(58) Field of Classification Search
USPC .............. 99/474, 476, 467; 219/682, 401; 126/369, 20
See application file for complete search history.

(56) References Cited

U.S. PATENT DOCUMENTS

| | | | |
|---|---|---|---|
| 7,199,340 B2* | 4/2007 | Yamasaki | H05B 6/6479 219/401 |
| 8,695,487 B2* | 4/2014 | Sakane | F24C 15/327 126/369 |
| 8,704,138 B2* | 4/2014 | Sells | A23L 5/13 126/20 |
| 2008/0148962 A1* | 6/2008 | Beausse | H05B 6/6479 99/339 |
| 2012/0091118 A1 | 4/2012 | Nozawa et al. | |

FOREIGN PATENT DOCUMENTS

| | | |
|---|---|---|
| JP | 2007-3090 A | 1/2007 |
| JP | 2007-040656 A | 2/2007 |
| JP | 2007-303750 A | 11/2007 |
| JP | 2007-327674 A | 12/2007 |
| JP | 2010-266111 A | 11/2010 |
| JP | 2010-276300 A | 12/2010 |
| JP | 2011-43259 A | 3/2011 |
| WO | WO 2010/143678 A1 | 12/2010 |

OTHER PUBLICATIONS

International Search Report, and English language translation thereof, in corresponding International Application No. PCT/JP2013/001789, dated Apr. 9, 2013, 3 pages.
Office Action for Chinese Application Serial No. 201380014796.X dated Sep. 29, 2015, 8 pages.
Extended Search Report in corresponding European Application No. 13764782.2, dated Feb. 15, 2016, 7 pages.
Office Action dated Jun. 13, 2016 for Chinese Application No. 201380014796.X, 8 pages.
Decision of Rejection in corresponding Japanese Application No. 2014-506031, dated Nov. 22, 2016, 4 pages.
Office Action, and partial English language translation thereof, in corresponding Chinese Application Serial No. 201380014796.X, dated Mar. 22, 2017, 7 pages.

* cited by examiner

HEATING COOKER

This application is 371 application of PCT/JP2013/001789 having an international filing date of Mar. 15, 2013, which claims priority to JP2012-062494 filed Mar. 19, 2012, the entire contents of which are incorporated herein by reference.

TECHNICAL FIELD

The present invention relates to a heating cooker having a steam generating unit to generate steam that is supplied into a heating chamber.

BACKGROUND ART

A heating cooker is conventionally known wherein a high-temperature air current circulating within a heating chamber is supplied with a saturated water vapor to make use of high-speed heating by a condensation heat transfer action of the water vapor on a food surface and of an advantage of restraining an outflow of vitamins, minerals, delicious components or the like (see, for example, Patent Document 1).

Figure 7:
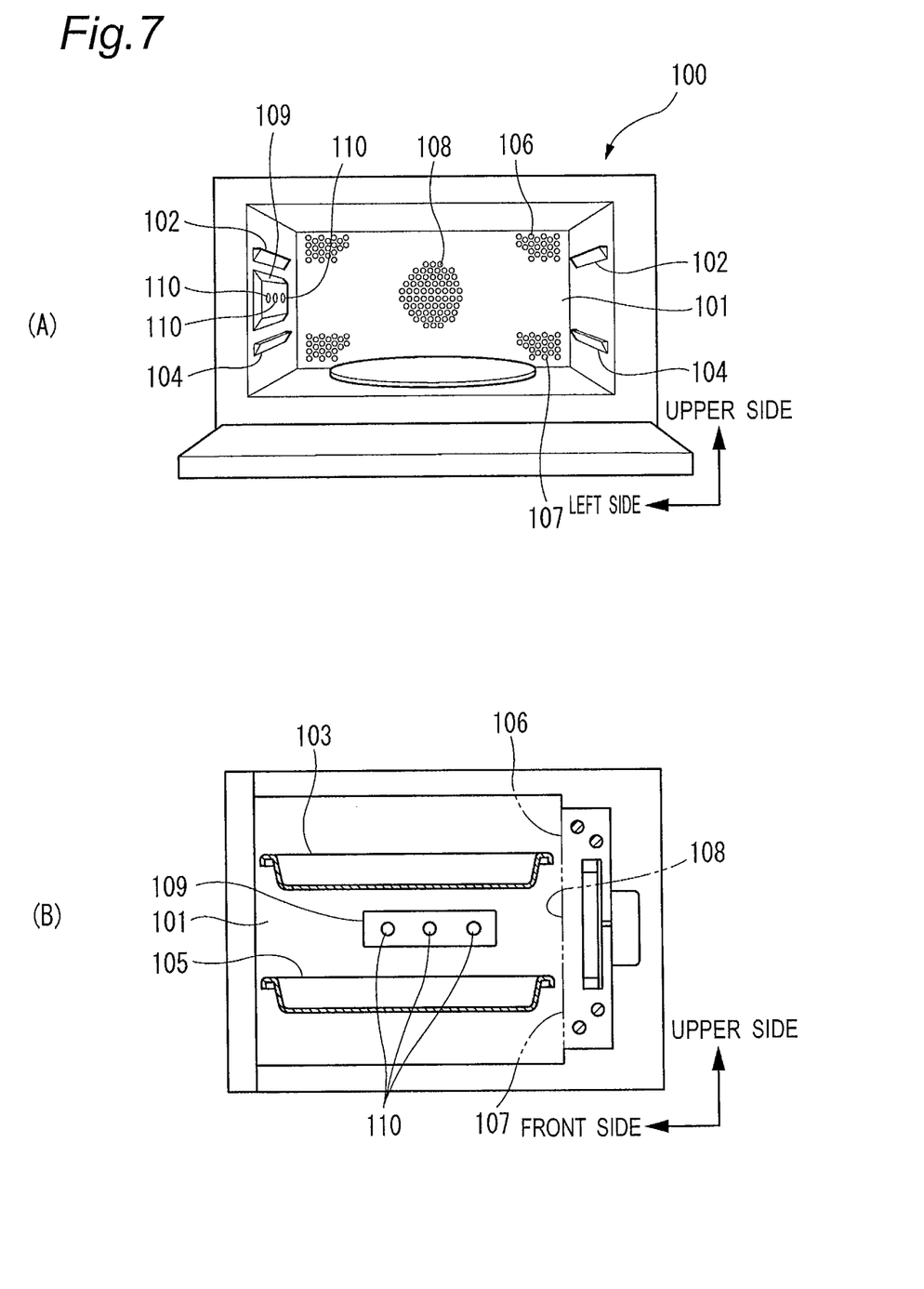
FIG. 7(A) is a front elevational view of a conventional heating cooker and FIG. 7(B) is a cross-sectional view of the conventional heating cooker, showing an internal configuration thereof as viewed from the side.

FIG. 7(A) is a front elevational view of a conventional heating cooker 100 and FIG. 7(B) is a cross-sectional view of the conventional heating cooker 100, showing an internal configuration thereof as viewed from the side. As shown in FIGS. 7(A) and 7(B), the conventional heating cooker 100 is provided with a pair of upper rails 102 each formed on a right inner wall surface or a left inner wall surface of a heating chamber 101 so as to extend in a front-back direction. The pair of upper rails 102 is used to removably place an upper cooking dish 103 thereon. A pair of lower rails 104 are each formed on the right inner wall surface or the left inner wall surface of the heating chamber 101 so as to extend in the front-back direction. The pair of lower rails 104 are used to removably place a lower cooking dish 105 thereon.

The heating chamber 101 has upper discharge holes 106 and lower discharge holes 107 defined in a rear wall thereof. The heating chamber 101 also has suction holes 108 defined in the rear wall thereof. Air inside the heating chamber 101 is inhaled through the suction holes 108 and heated by a heater, and the heated air is discharged into the heating chamber 101 through the upper discharge holes 106 and the lower discharge holes 107.

A steam guide 109 is fixed to the left inner wall surface of the heating chamber 101 between the upper rail 102 and the lower rail 104. The steam guide 109 has a plurality of guide portions 110 formed therewith, which have a cylindrical shape extending horizontally in a right-left direction and are connected to a steam port of a steam generating unit (not shown). Each guide portion 110 guides steam supplied from the steam port of the steam generating unit. The steam supplied from the steam port is guided along inner peripheral surfaces of the guide portions 110 and supplied into the heating chamber 101 so as to flow horizontally straight at a height between the upper rails 102 and the lower rails 104.

Patent Document 1: JP 2007-3090 A

SUMMARY OF THE INVENTION

Problems to be Solved by the Invention

In the conventional heating cooker 100 of the above-described configuration, the steam guide 109 is provided between the upper rail 102 and the lower rail 104. For this reason, a portion of the steam ejected into the heating chamber 101 from the guide portions 110 of the steam guide 109 flows upwardly of the upper cooking dish 103 supported on the upper rails 102. As a result, the steam concentration is likely to reduce in a space between a lower surface of the upper cooking dish 103 and an upper surface of the lower cooking dish 105. In order to make this space have a desired steam concentration, time corresponding to an amount of steam flowing upwardly is required. Also, in order to make such a space above the lower cooking dish 105 have a desired steam concentration within a short period of time, it is necessary to increase the power consumption of the steam generating unit. Further, because the steam guide 109 is made up of a plurality of guide portions 110 each in the form of a cylindrical shape, the number of component parts and the assembling man-hours increase, thus resulting in an increase in manufacturing cost.

The present invention has been developed in view of the above-described situations and is intended to provide a heating cooker capable of realizing a cooking region of a steam concentration required for cooking in a heating chamber within a short period of time, while restraining an increase in manufacturing cost and an increase in power consumption.

Means to Solve the Problems

A heating cooker embodying the present invention comprises a housing having a heating chamber defined therein so as to open on a front surface; cooking dish support sections respectively provided on mutually opposed inner wall surfaces of the heating chamber to support opposite ends of a cooking dish in one of a plurality of vertically spaced support positions; a steam generating unit operable to generate steam; and a steam ejecting portion having a single discharge port provided in an inner wall surface of the heating chamber and a steam passageway provided to guide the steam generated by the steam generating unit to the discharge port, the steam ejecting portion being operable to eject the steam into the heating chamber through the discharge port, wherein the single discharge port is provided in one of the inner wall surfaces confronting a space between the cooking dish supported in an uppermost support position of the cooking dish support sections and a ceiling surface of the heating chamber.

Effects of the Invention

The heating cooker according to the present invention can realize a cooking region of a steam concentration required for cooking in the heating chamber within a short period of time, while restraining an increase in manufacturing cost and an increase in power consumption.

DETAILED DESCRIPTION OF THE PREFERRED EMBODIMENTS

A heating cooker of a first invention comprises a housing having a heating chamber defined therein so as to open on a front surface; cooking dish support sections respectively provided on mutually opposed inner wall surfaces of the heating chamber to support opposite ends of a cooking dish in one of a plurality of vertically spaced support positions; a steam generating unit operable to generate steam; and a steam ejecting portion having a single discharge port provided in an inner wall surface of the heating chamber and a steam passageway provided to guide the steam generated by the steam generating unit to the discharge port, the steam ejecting portion being operable to eject the steam into the heating chamber through the discharge port, wherein the single discharge port is provided in one of the inner wall surfaces confronting a space between the cooking dish supported in an uppermost support position of the cooking dish support sections and a ceiling surface of the heating chamber.

This configuration can supply steam to a space between the cooking dish supported in the uppermost support position of the cooking dish support sections and the ceiling surface of the heating chamber through the discharge port of the steam ejecting portion and does not allow the supplied steam to escape upwardly. It is accordingly possible to obtain a cooking region having a steam concentration required for cooking in the heating chamber within a short period of time while restraining an increase in power consumption associated with steam generation. Also, because the steam ejecting portion can be realized by a simple construction having a single discharge port, an increase in manufacturing cost can be also restrained.

In the heating cooker according to the first invention, the second invention is characterized in that the steam passageway of the steam ejecting portion comprises a single pipe having one end connected to the steam generating unit and the other end connected to the single discharge port. This configuration can simplify the configuration of the steam ejecting portion, thus making it possible to restrain an increase in manufacturing cost.

An embodiment of the present invention is described hereinafter with reference to the drawings, but the present invention is not limited by this embodiment.

Embodiment

Figure 1:
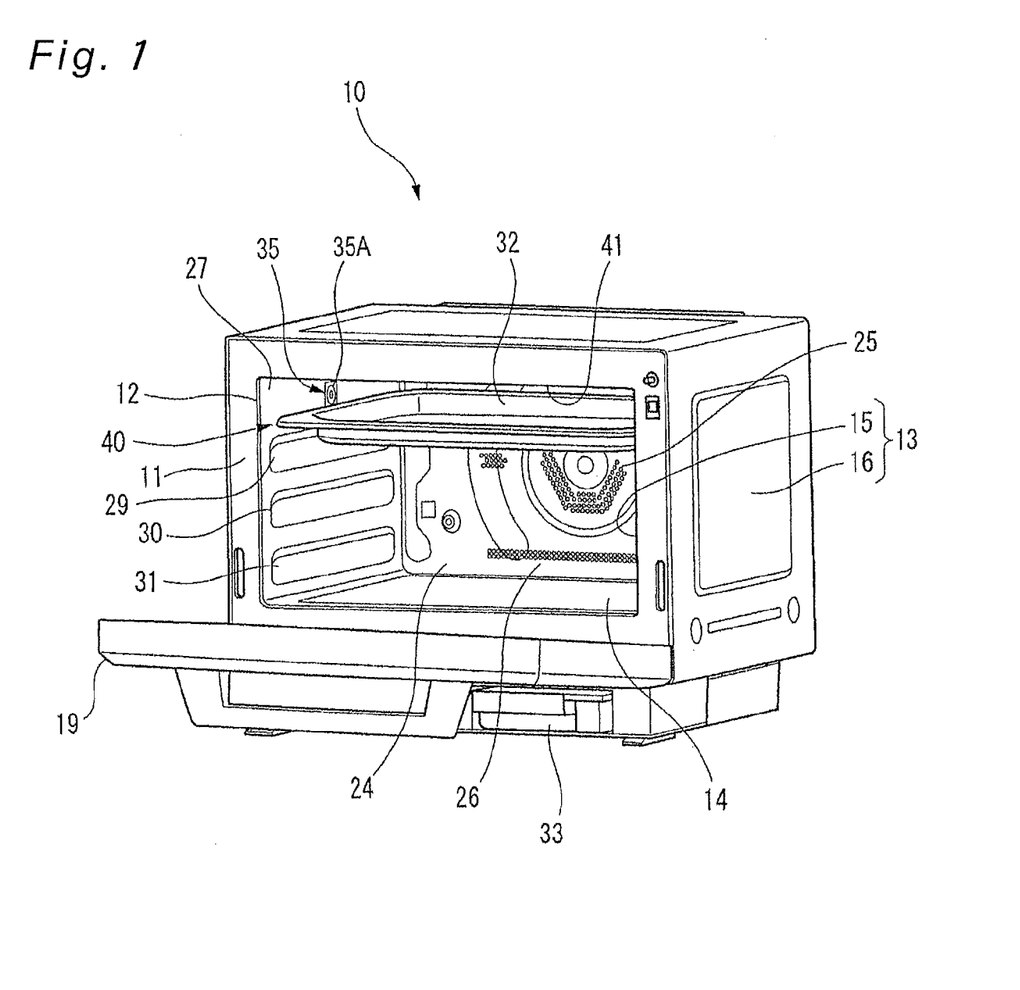
FIG. 1 is a perspective view of a heating cooker according to a first embodiment of the present invention with a door opened.
Figure 2:
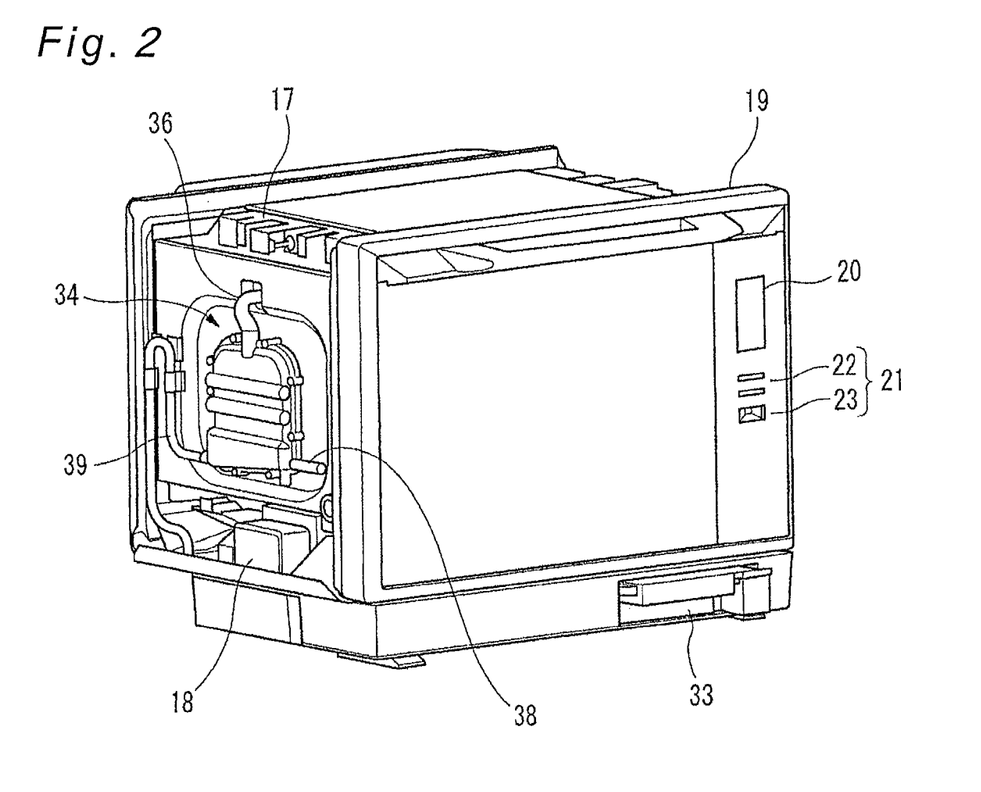
FIG. 2 is a perspective view of the heating cooker according to the first embodiment of FIG. 1 as viewed from the side of a steam generating unit with an outer casing removed.
Figure 3:
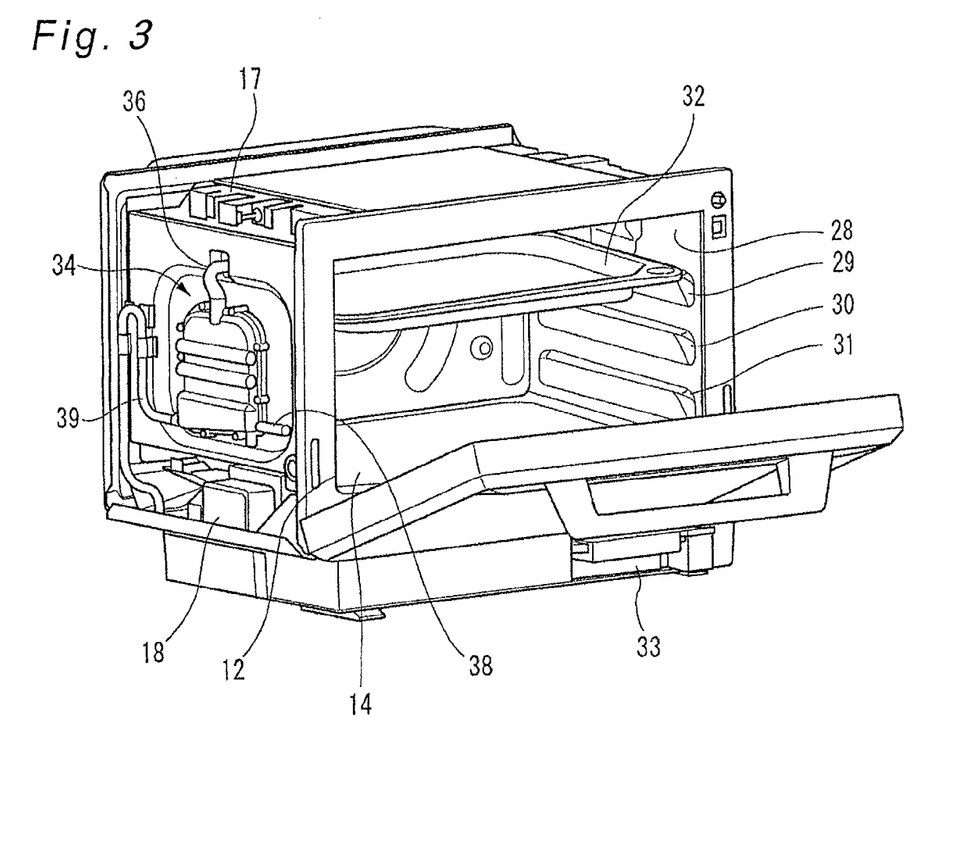
FIG. 3 is a perspective view of the heating cooker according to the first embodiment of FIG. 2 with the door opened.

FIG. 1 is a perspective view of a heating cooker according to a first embodiment of the present invention with a door opened, FIG. 2 is a perspective view of the heating cooker of FIG. 1 as viewed from the side of a steam generating unit with an outer casing of a housing removed, and FIG. 3 is a perspective view of the heating cooker of FIG. 2 with the door opened.

As shown in FIG. 1, the heating cooker 10 according to this embodiment is provided with a box-shaped rectangular housing 13 having an opening 12 defined in a front surface 11. The housing 13 includes an inner casing 15 having a heating chamber 14 formed inside thereof and an outer casing 16 for covering the inner casing 15. An object to be heated is taken in and out of the heating chamber 14 formed inside the housing 13 through the opening 12.

As shown in FIG. 2, the housing 13 also includes an upper electric chamber 17 formed above the heating chamber 14 and a lower electric chamber 18 formed below the heating chamber 14. A door 19 is mounted to the housing 13 at a location below the opening 12 so as to be opened and closed about a horizontal center of rotation. Upon rotation of the door 19, the heating chamber 14 is closed when the door 19 is located in a vertical position and opened when the door 19 is located in a horizontal position.

As viewed from the front, a display portion 20 and an operating portion 21 are disposed on a side portion of the door 17. The operating portion 21 is disposed on the door 19 such that a portion of the operating portion 21 overlaps with an internal space of the heating chamber 14 as viewed from the front. The operating portion 21 includes various operating switches 22 and a cooking switch 23 required for cooking operations of the heating cooker 10.

The lower electric chamber 18 accommodates therein a magnetron (not shown) for generating microwaves, a magnetron drive power source (not shown) for supplying the magnetron with electric power, a control unit (not shown) for controlling, for example, a microwave-generating operation, and the like.

A heater (convection heater (not shown)), which is a heat source, is provided between a rear surface 24 of the heating chamber 14 and the outer casing 16. The convection heater is disposed in a storage space sandwiched between the rear surface 24 of the heating chamber 14 and the outer casing 16. A circulation fan (not shown) is provided on the central side of the convection heater. The rear surface 24 of the heating chamber 14 has suction holes 25 and discharge holes 26 defined therein and air inside the heating chamber 14 is inhaled into the suction holes 25 through a rotational drive of the circulation fan and subsequently heated by the convection heater before returning to the heating chamber 14 again through the discharge holes 26, thereby uniformly heating an object to be cooked at high temperature.

An upper heater or another heat source may be additionally provided on an upper side of the heating chamber 14. The upper heater generates heat to heat the object to be cooked inside the heating chamber 14 by radiant heat.

The inner casing 15 of the housing 13 is provided with cooking dish support sections formed on or with a pair of opposed inner wall surfaces to support opposite ends of cooking dishes in a plurality of vertically spaced support positions. More specifically, as shown in FIGS. 1 and 3, the cooking dish support sections include a pair of upper rails 29, a pair of middle rails 30 and a pair of lower rails 31 each formed on a left inner wall surface 27 (see FIG. 1) or a right inner wall surface 28 (see FIG. 3) so as to extend in a front-back direction. The left inner wall surface 27 and the right inner wall surface 28 are a pair of parallel inner wall surfaces of the inner casing 15 sandwiching the opening 12 of the heating chamber 14. Each pair of the upper rails 29, the middle rails 30 and the lower rails 31 are used to removably place opposite ends of a cooking dish 32 thereon. That is, the opposite ends of the cooking dish 32 are supported on the right and left inner wall surfaces 28, 27 via the rails and, hence, the cooking dish 32 is supported at an arbitrary stage (in an arbitrary support position) of a plurality of vertically spaced support positions (upper, middle and lower support positions) within the heating chamber 14. The heating cooker 10 is provided with at least one cooking dish 32 and may be provided with a plurality of cooking dishes 32.

In order to supply the heating chamber 14 with steam, the heating cooker 10 is provided with a water tank 33 for accommodating water therein, a steam generating unit 34 for generating steam using the water supplied from the water tank 33, and a steam ejecting portion 35 for ejecting the steam generated by the steam generating unit 34 into the heating chamber 14 to supply the heating chamber 14 with the steam.

As shown in FIG. 2, the water tank 33 is disposed below the lower electric chamber 18. The steam generating unit 34 is provided between the inner casing 15 and the outer casing 16 of the housing 13 and supplied with the water in the water tank 33 by a pump motor (not shown) to generate steam. The steam ejecting portion 35 includes a steam connecting pipe 36, which is a steam passageway for connecting the steam generating unit 34 and the heating chamber 14, and has a discharge port 35A provided as an opening defined in the left inner wall surface 27 of the heating chamber 14 and connected to one end of the steam connecting pipe 36. The steam generated by the steam generating unit 34 is ejected and supplied into the heating chamber 14 from the discharge port 35A through the steam connecting pipe 36, thereby steam-heating an object to be cooked.

A control circuit having a CPU, a ROM and a RAM is provided in a controller accommodated in the lower electric chamber 18 for control of cooking and water filling. A heating chamber temperature sensor (not shown) for detecting the temperature inside the heating chamber 14 and a steam temperature sensor (not shown) for detecting the temperature of the steam generated by the steam generating unit 34 are connected to the control circuit. The control circuit detects the temperature inside the heating chamber 14 based on an output signal from the heating chamber temperature sensor and also detects the temperature of the steam generating unit 34 based on an output signal from the steam temperature sensor. Also, the operating switches 22 and the cooking switch 23 referred to above are connected to the control circuit. A user uses these switches to input cooking information such as, for example, a cooking menu, a cooking temperature, the presence or absence of preheating, and the like. The control circuit has a function of detecting such cooking information as the cooking menu, the cooking temperature, the presence or absence of preheating, and the like in accordance with the operation contents of the plurality of switches.

The control circuit has a function of independently controlling the circulation fan, the convection heater, the upper heater, the magnetron, the circulation fan, and the pump motor (all not shown) based on detection results of the cooking information. Further, the control circuit is supplied with electric power from a main power unit connected to a commercially available power source to control power distribution to the magnetron, the convection heater, the upper heater, the steam generating unit 34 and the like so that electric power required for heating them may not exceed an allowable power value.

Figure 4:
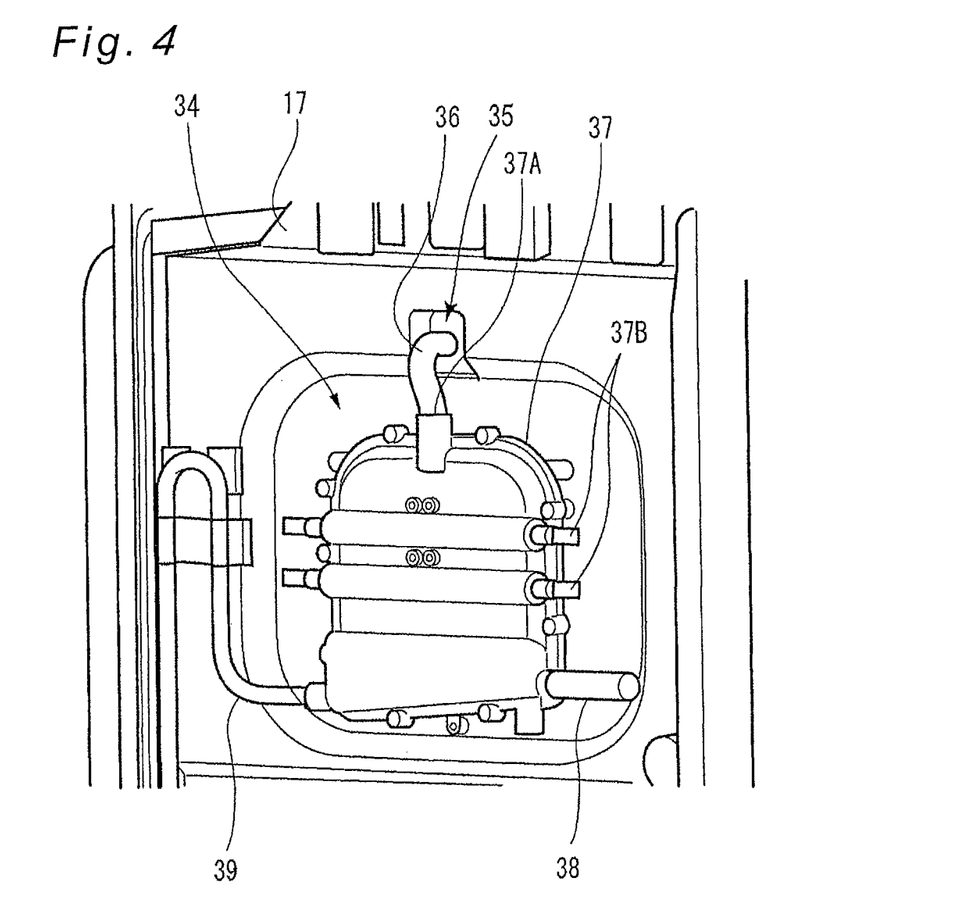
FIG. 4 is an enlarged view of the steam generating unit in the heating cooker according to the first embodiment of FIG. 3.
Figure 5:
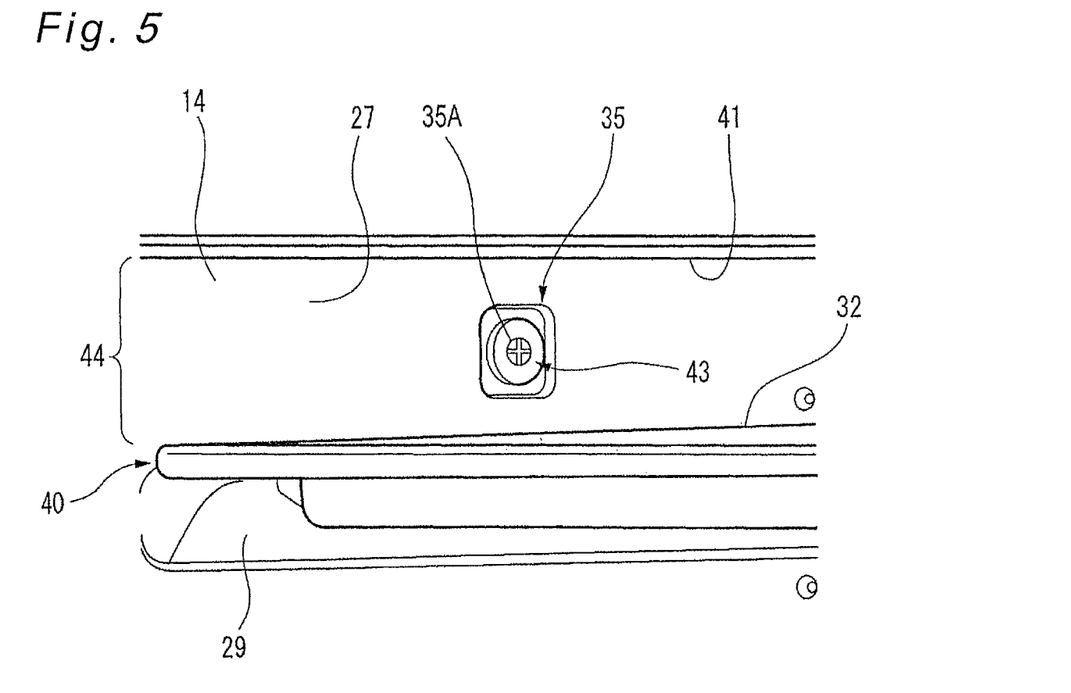
FIG. 5 is an enlarged view of a steam ejecting portion in the heating cooker according to the first embodiment of FIG. 1.
Figure 6:
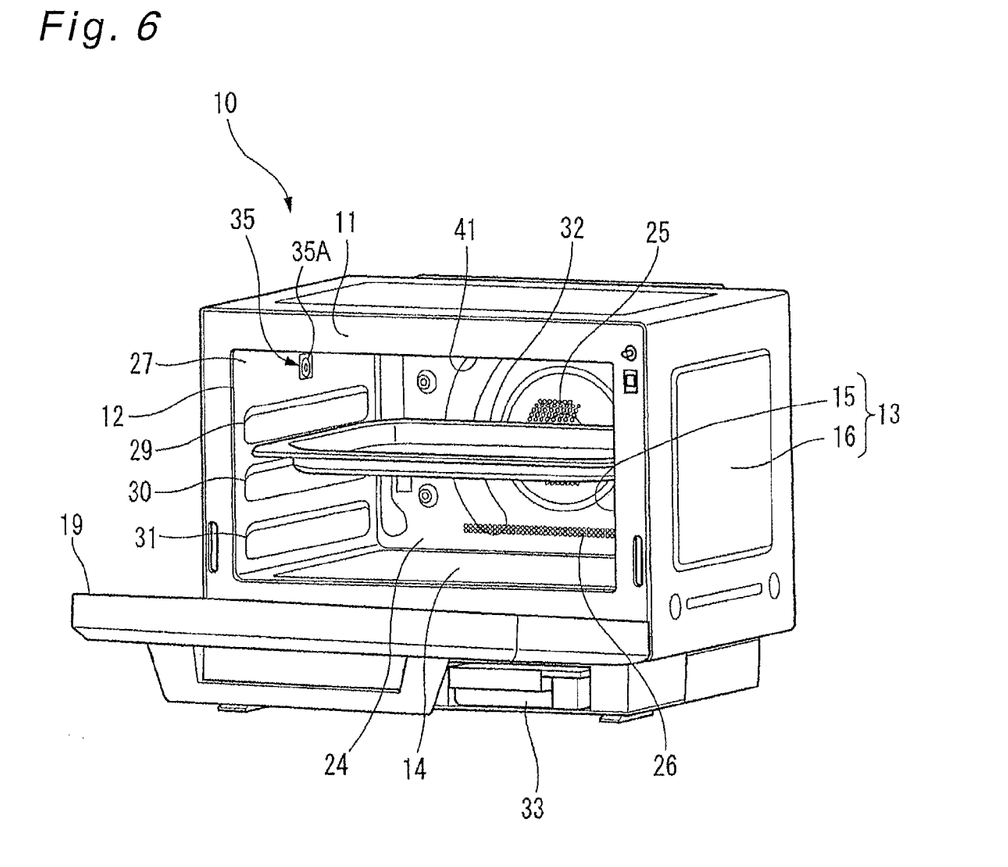
FIG. 6 is a perspective view of the heating cooker according to the first embodiment with a cooking dish mounted in a middle position.

FIG. 4 is an enlarged view of the steam generating unit 34 shown in FIG. 3, FIG. 5 is an enlarged view of the steam ejecting portion 35 shown in FIG. 1, and FIG. 6 is a perspective view of the heating cooker 10 with the cooking dish 32 mounted in the middle support position.

The steam generating unit 34 has a steam boiler 37 made of light and highly thermal conductive die-casting aluminum. A water supply pipe 38 for supplying water from the water tank 33 therethrough and a siphon drain pipe 39 for draining water inside the steam boiler 37 therethrough are connected to the steam boiler 37. The steam boiler 37 has a supply port 37A defined therein to supply generated steam and the other end of the steam connecting pipe 36 of the steam ejecting portion 35 is connected to the supply port 37A. As shown in FIG. 4, a steam-generating heater 37B is provided inside the steam boiler 37 to boil water supplied from the water supply pipe 38. The boiled water turns into steam expanded in volume (for example, saturated steam), which is in turn fed to the steam connecting pipe 36 through the steam supply port 37A.

In the steam ejecting portion 35, a distal end of the steam connecting pipe 36 is connected to the discharge port 35A. As shown in FIG. 1, the discharge port 35A of the steam ejecting portion 35 is provided in an inner wall surface (left inner wall surface 27) confronting a space delimited between a cooking dish 32, which is supported on the uppermost rails 29 of the cooking dish support sections or supported in an uppermost support position 40 of the plurality of vertically spaced support positions, and a ceiling surface 41 of the heating chamber 14. The discharge port 35A of the steam ejecting portion 35 is connected to the steam generating unit 34 through the single supply port 37A and the single steam connecting pipe 36 and supplied with the generated steam. As shown in FIG. 5, the discharge port 35A of the steam ejecting portion 35 is provided at a single site of the left inner wall surface 27 of the heating chamber 14. Also, as shown in FIG. 5, the discharge port 35A may be a terminal of a steam guide passageway that is open in the form of a cross-shaped hole 43. Lattice-shaped holes may be employed in place of the cross-shaped hole 43. The use of the discharge port 35A in the form of the cross-shaped hole 43 or lattice-shaped holes can prevent foreign substances from entering the discharge port 35A and, at the same time, produce an effect of appropriately diffusing ejected steam.

The operation of the heating cooker 10 of the above-described construction according to this embodiment is explained hereinafter.

In performing grill-heating while steam-heating with the use of the heating cooker 10, the door 19 is first opened, a cooking dish 32 is mounted in the heating chamber 14, and an object to be cooked is placed on the cooking dish 32. Thereafter, the door 19 is closed, a desired heating mode is set by operating the operating switches 22, and the cooking switch 23 is operated.

High-frequency waves are generated by the magnetron and supplied into and diffused within the heating chamber 14. A high-frequency absorbing film of the cooking dish 32 generates heat to heat a high-frequency heating element, and heat from the high-frequency heating element is transmitted to the object to be cooked through a metallic plate. Also, a portion of the generated high-frequency waves pass between the inner wall surfaces of the heating chamber 14 and the cooking dish 32 and enter a space above the cooking dish 32 to heat the object to be cooked with the high-frequency waves. Further, upon activation of the upper heater, the object to be cooked on the cooking dish 32 is heated by radiant heat.

The steam generating unit 34 is supplied with water from the water tank 33 by the pump motor. The steam generating unit 34 boils the water so supplied using the steam-generating heater 37B to generate steam (for example, saturated steam). The generated steam is supplied to an upper space of the heating chamber 14 from the discharge port 35A through the steam connecting pipe 36. This steam impinges on the object to be cooked and subsequent heat exchange cooks the object to be cooked, thus performing steam-heating.

In the heating cooker 10, when the cooking dish 32, which can be supported in an arbitrary position of the plurality of vertically spaced support positions, is supported in the uppermost support position 40, a small cooking region 44 (see FIG. 5) that is a space between the cooking dish 32 and the ceiling surface 41 of the heating chamber 14 is formed by being partitioned within the heating chamber 14. That is, because an upper side of the space above the cooking dish 32 is closed by the ceiling surface 41, this space (that is, the cooking region 44) is effectively utilized as a storage space for ascending high-temperature air. The steam generated by the steam generating unit 34 is ejected from the single discharge port 35A defined in an inner wall surface (left inner wall surface 27) of the cooking region 44 through the single steam connecting pipe 36. The small cooking region 44 is filled with the steam so ejected. For this reason, the cooking region 44 is filled with the steam in a short period of time compared with a case where the cooking dish 32 is supported in a support position other than the uppermost support position 40 or a case where the cooking dish 32 is not used. This is because if the amount of steam to be ejected is the same, the steam concentration of a mixture gas of steam and air increases with a reduction in the amount of air in the region into which the steam is ejected.

Also, the steam generating unit 34 is connected to the single discharge port 35 by the single supply port 37A and the single steam connecting pipe 36 and, hence, the steam ejection pressure increases compared with a case where a plurality of supply ports and a plurality of discharge ports are provided.

Because the discharge port 35A of the steam ejecting portion 35 is positioned on an upper side of an inner wall surface of the heating chamber 14 (in particular, on an upper side of the uppermost support position 40), the temperature and the steam concentration increase rapidly within the cooking region 44 partitioned by the cooking dish 32, thus making it possible to rapidly cook or heat the object to be cooked. In this case, the object to be cooked can be most rapidly cooked when the cooking dish 32 is supported in the uppermost support position 40 shown in FIG. 1 (supported on the upper rails 29) and then when the cooking dish 32 is supported in the middle support position shown in FIG. 6 (supported on the middle rails 30).

Further, in the heating cooker 10, high-pressure steam is ejected into the cooking region 44 from a single site (that is, from the single discharge port 35A). Because of this, it is likely that unidirectional forced convection of a mixture gas of steam and air is created, thus making it possible to effectively agitate an atmosphere of the cooking region 44 using a small number of members (component parts of the steam ejecting portion 35 such as the steam connecting pipe 36 and the like). Also, heating cookers are often provided with a heating chamber having an opening width greater than a depth. In the heating chamber 14 shaped like this, the length of a steam jet flow flowing through the cooking region 44 increases by ejecting steam from an inner wall surface (side surface) compared with a case where the steam is ejected from a rear surface 24 of the heating chamber 14, thereby making it possible to further enhance the agitating efficiency of the atmosphere compared with a case where the discharge port 35A of the steam ejecting portion 35 is formed in the rear surface 24 of the heating chamber 14.

As just described, the heating cooker 10 according to this embodiment can supply steam to a space between the cooking dish 32 supported in the uppermost support position 40 of the cooking dish support sections and the ceiling surface 41 of the heating chamber 14 through the discharge port 35A of the steam ejecting portion 35 and does not allow the supplied steam to escape upwardly. Accordingly, the cooking region 44 formed within the heating chamber 14 can have a steam concentration required for cooking within a short period of time while restraining an increase in power consumption of the steam-generating heater 37B. Also, because the steam ejecting portion 35 can be realized by a simple construction having a single discharge port 35A and a single steam connecting pipe 36, an increase in manufacturing cost can be also restrained.

Any combination of the various embodiments referred to above can produce respective effects.

Although the present invention has been fully described by way of preferred embodiments with reference to the accompanying drawings, it is to be noted here that various changes and modifications will be apparent to those skilled in the art. Therefore, unless such changes and modifications otherwise depart from the scope of the present invention as set forth in the appended claims, they should be construed as being included therein.

INDUSTRIAL APPLICABILITY

The present invention is suited to a heating cooker having a steam generating unit.

What is claimed is:

1. A heating cooker comprising: a housing provided with an inner casing having a heating chamber defined therein so as to open on a front surface and with an outer casing for covering the inner casing;
   a door operable to open and close the heating chamber;
   cooking dish support sections respectively provided on mutually opposed inner wall surfaces of the heating chamber to support opposite ends of a cooking dish in one of a plurality of vertically spaced support positions;
   a water tank accommodating water therein;
   a steam generating unit provided in a side wall of the housing between the inner casing and the outer casing to generate steam using water supplied from the water tank; and
   a steam ejecting portion having a single discharge port provided in an inner wall surface of the heating chamber and a steam passageway having one end connected to an upper portion of the steam generating unit and the other end connected to the discharge port,
   wherein a water supply pipe operable to supply water from the water tank to the steam generating unit and a drain pipe operable to drain water inside the steam generating unit are connected to a lower portion of the steam generating unit, and the single discharge port is provided in one of the inner wall surfaces confronting a space between the cooking dish supported in an uppermost support position of the cooking dish support sections and a ceiling surface of the heating chamber.

2. A heating cooker comprising: a housing provided with an inner casing having a heating chamber defined therein so as to open on a front surface and with an outer casing for covering the inner casing;
   a door operable to open and close the heating chamber;
   cooking dish support sections respectively provided on mutually opposed inner wall surfaces of the heating chamber to support opposite ends of a cooking dish in one of a plurality of vertically spaced support positions;
   a water tank accommodating water therein;

a steam generating unit provided in a side wall of the housing between the inner casing and the outer casing to generate steam using water supplied from the water tank; and a steam ejecting portion having a single discharge port provided in an inner wall surface of the heating chamber and a steam passageway having one end connected to an upper portion of the steam generating unit and the other end connected to the discharge port, wherein the steam passageway of the steam ejecting portion comprises a single pipe having one end connected to the steam generating unit and the other end connected to the single discharge port, and wherein a water supply pipe operable to supply water from the water tank to the steam generating unit and a drain pipe operable to drain water inside the steam generating unit are connected to a lower portion of the steam generating unit, and the single discharge port is provided in one of the inner wall surfaces confronting a space between the cooking dish supported in an uppermost support position of the cooking dish support sections and a ceiling surface of the heating chamber.

\* \* \* \* \*